United States Patent
Reddy et al.

(10) Patent No.: US 10,415,952 B2
(45) Date of Patent: Sep. 17, 2019

(54) ANGULAR POSITION SENSOR AND ASSOCIATED METHOD OF USE

(71) Applicant: Microsemi Corporation, Aliso Viejo, CA (US)

(72) Inventors: Battu Prakash Reddy, Hyderabad (IN); Ganesh Shaga, Warangal (IN)

(73) Assignee: Microsemi Corporation, Chandler, AZ (US)

( * ) Notice: Subject to any disclaimer, the term of this patent is extended or adjusted under 35 U.S.C. 154(b) by 114 days.

(21) Appl. No.: 15/722,386

(22) Filed: Oct. 2, 2017

(65) Prior Publication Data

US 2018/0120083 A1    May 3, 2018

(30) Foreign Application Priority Data

Oct. 28, 2016  (IN) .............................. 201621037073

(51) Int. Cl.
  *G01B 7/30*    (2006.01)
  *G01D 5/20*    (2006.01)

(52) U.S. Cl.
  CPC ............. *G01B 7/30* (2013.01); *G01D 5/2053* (2013.01)

(58) Field of Classification Search
  None
  See application file for complete search history.

(56) References Cited

U.S. PATENT DOCUMENTS

| | | | |
|---|---|---|---|
| 4,847,548 A | 7/1989 | Lafler | |
| 4,853,604 A | 8/1989 | McMullin et al. | |
| 5,061,896 A | 10/1991 | Schmidt | |
| 5,239,288 A | 8/1993 | Tsals | |
| 6,236,199 B1 | 5/2001 | Irle et al. | |
| 6,239,571 B1 | 5/2001 | Shimahara | |
| 6,255,810 B1 | 7/2001 | Irle et al. | |
| 6,304,014 B1 * | 10/2001 | England | G01D 5/2073 310/68 B |
| 6,304,076 B1 | 10/2001 | Madni et al. | |
| 6,522,128 B1 | 2/2003 | Ely et al. | |

(Continued)

FOREIGN PATENT DOCUMENTS

| | | |
|---|---|---|
| DE | 10120822 A1 | 4/2002 |
| EP | 0467514 A2 | 1/1992 |

(Continued)

OTHER PUBLICATIONS

"A Revolution in Sensing: World's First Inductance-to-Digital Converter", LDC1000 Inductive Sensing Brochure, Texas Instruments, 2013, pp. 1-6, Almaden Press, San Jose, CA.

*Primary Examiner* — Douglas X Rodriguez
(74) *Attorney, Agent, or Firm* — Glass and Associates; Kenneth Glass (57) ABSTRACT

An angular position sensor comprising at least one planar excitation coil and at least two planar sensing coils positioned within an interior of the at least one planar excitation coil, each of the at least two planar sensing coils comprising a clockwise winding portion positioned opposite a counter-clockwise winding portion and a rotatable inductive coupling element comprising a sector aperture, the rotatable inductive coupling element positioned in overlying relation to the at least one planar excitation coil and separated from the at least one planar excitation coil by an air gap.

20 Claims, 6 Drawing Sheets

(56) References Cited

U.S. PATENT DOCUMENTS

| | | |
|---|---|---|
| 6,593,730 B2 * | 7/2003 | Zapf .................... G01D 5/2275 324/207.17 |
| 6,605,940 B1 | 8/2003 | Tabrizi et al. |
| 7,276,897 B2 | 10/2007 | Lee |
| 7,726,208 B2 | 6/2010 | Hoeller et al. |
| 7,821,256 B2 | 10/2010 | Lee |
| 8,508,242 B2 | 8/2013 | Shao et al. |
| 8,947,077 B2 | 2/2015 | Lee et al. |
| 9,677,913 B2 | 6/2017 | Wang et al. |
| 2003/0206007 A1 | 11/2003 | Gass et al. |
| 2004/0080313 A1 | 4/2004 | Brosh |
| 2008/0164869 A1 * | 7/2008 | Bach ....................... G01P 3/488 324/207.15 |

FOREIGN PATENT DOCUMENTS

| | | |
|---|---|---|
| EP | 1914520 A2 | 4/2008 |
| EP | 2145158 A2 | 1/2010 |
| FR | 2304900 A1 | 10/1976 |
| JP | 3839449 B2 | 8/2006 |
| WO | 2008125853 A1 | 10/2008 |

\* cited by examiner

| Establishing A Magnetic Coupling Between At Least One Planar Excitation Coil And At Least Two Planar Sensing Coils To Induce A Time Varying Voltage In The At Least Two Planar Sensing Coils, Wherein The At Least Two Planar Sensing Coils Are Positioned Within An Interior Of The At Least One Planar Excitation Coil And Wherein Each Of The At Least Two Planar Sensing Coils Comprises A Clockwise Winding Portion Positioned Opposite A Counter-Clockwise Winding Portion | ~ 605 |

↓

| Positioning A Rotatable Inductive Coupling Element Comprising A Sector Aperture In Overlying Relation To The At Least One Planar Excitation Coil And Separated From The At Least One Planar Excitation Coil By An Air Gap, The Rotatable Inductive Coupling Element To Cause A Variation In A Magnetic Coupling Between The At Least One Planar Excitation Coil And The Winding Portions Of Each Of The At Least Two Planar Sensing Coils Over Which The Sector Aperture Of The Rotatable Inductive Coupling Element Is Not Substantially Aligned | ~ 610 |

↓

| Measuring A Time Varying Voltage Induced In The At Least Two Planar Sensing Coils As A Result Of The Variation In The Magnetic Coupling Between The At Least One Planar Excitation Coil And The Winding Portions Of Each Of The At Least Two Planar Sensing Coils Over Which The Sector Aperture Of The Rotatable Inductive Coupling Element Is Not Substantially Aligned To Determine An Angular Position Of The Rotatable Inductive Coupling Element Relative To The Position Of The At Least Two Planar Sensing Coils | ~ 615 |

*FIG. 6*

ANGULAR POSITION SENSOR AND ASSOCIATED METHOD OF USE

BACKGROUND OF THE INVENTION

Numerous industries, including the automotive, industrial and aerospace industries, place stringent reliability requirements on their position sensing systems. Potentiometers are commonly known in the art for use in position sensing systems and are specifically used for determining displacement angles of motor controlled or regulated elements. Although potentiometers are a relatively inexpensive solution for position sensing, they are also susceptible to the effects of adverse environmental conditions and are subject to failure resulting from numerous operations over time. To overcome the disadvantages of potentiometer based sensing systems, non-contact sensors are increasingly being used to meet the stringent reliability requirements. Non-contact sensors are currently known in the art and may be based on various principles, including inductive, capacitive, Hall effect or magneto-resistive principles.

A non-contact sensor based on inductive principles in commonly known as an inductive position sensor, or a resolver. An inductive position sensor comprises a coil assembly having one or more excitation coils and two or more sensing coils. In the operation of an inductive position sensor, an alternating current (AC) is injected into the excitation coil(s) which results in the generation of a time varying magnetic field in the vicinity of the excitation coil. The time varying magnetic field is sufficient to induce a time varying voltage in the sensing coils as a result of the mutual magnetic coupling between the excitation coil and the sensing coils. To determine an angular position of a rotatable target with respect to the coil assembly, a conductive target is rotatably positioned within the time varying magnetic field between the excitation coil and the sensing coils. The presence of the rotatable target within the time varying magnetic field changes the mutual magnetic coupling between the excitation coil and the sensing coils, relative to the position of the rotatable target. The change in mutual coupling between the excitation coil and the sensing coils alters the time varying voltage induced in the sensing coils. Since the magnitude of the voltage change induced in the sensing coils is generally sinusoidal with respect to the angular position of the rotatable target relative to the coil assembly, the time varying voltage within the sensing coils can be measured and processed to determine the angular position of the rotatable target.

A coil assembly commonly used in conventional electro-mechanical resolvers is comprised of axial windings wound on a Ferro-magnetic core. However, this type of resolver assembly is expensive and consumes a considerable amount of space. In order to reduce the cost and size of resolvers, it is also known in the art to form planar coils on one or more printed circuit boards (PCB) to provide the coil assembly of the resolver. However, the design of planar coil assemblies for inductive sensors currently known in the art require that the coils be spread across multiple layers of the PCB and require a significant number of PCB vias between the PCB layers to establish the required connections between the layers. Utilizing multiple PCB layers and requiring numerous vias between the layers undesirably increases the cost of the inductive sensor assembly.

Accordingly, what is needed in the art is a non-contact angular position sensor utilizing a planar coil assembly that can be implemented on a printed circuit board (PCB) comprising a reduced number of PCB layers.

SUMMARY OF THE INVENTION

In various embodiments, the present invention provides a system and method for sensing an angular position of a rotatable inductive coupling element. The system and method of the present invention provides an improved, non-contact, inductive, angular position sensor which utilizes a planar coil assembly that can be implemented on a printed circuit board (PCB) comprising a reduced number of PCB layers as compared to the prior art.

In one embodiment, the present invention provides an angular position sensor comprising, at least one planar excitation coil and at least two planar sensing coils positioned within an interior of the at least one planar excitation coil, each of the at least two planar sensing coils comprising a clockwise winding portion positioned opposite a counter-clockwise winding portion. The angular position sensor further comprises a rotatable inductive coupling element comprising a sector aperture, the rotatable inductive coupling element positioned in overlying relation to the at least one planar excitation coil and separated from the surface of the substrate by an air gap.

In the angular sensor of the present invention, each of the clockwise winding portion and the counter-clockwise winding portion of each of the at least two planar sensing coils comprises at least one winding turn and the number of winding turns of the clockwise winding portion is equal to a number of winding turns of the counter-clockwise winding portion.

In a particular embodiment, the rotatable inductive coupling element is a rotatable conductive disk having a radius that is substantially equal to a radius of the at least one planar excitation coil and the sector aperture comprises a central angle that is determined by a number of the at least two planar sensing coils.

In a particular embodiment, the angular position sensor may be fabricated on a substrate comprising two or more layers and the at least one planar excitation coil and the at least two planar sensing coils may be positioned on a same layer of the substrate. In an alternative embodiment, the at least one planar excitation coil may be positioned on a different layer than the at least two planar sensing coils.

In an additional embodiment, an angular position sensing system is provided which includes, an angular position sensor comprising, at least one planar excitation coil, at least two planar sensing coils positioned within an interior of the at least one planar excitation coil, each of the at least two planar sensing coils comprising a clockwise winding portion positioned opposite a counter-clockwise winding portion and a rotatable inductive coupling element comprising a sector aperture, the rotatable inductive coupling element positioned in overlying relation to the at least one planar excitation coil and separated from the at least one planar excitation coil by an air gap. The system further includes, a sinusoidal alternating current source coupled to the at least one planar excitation coil of the angular position sensor and a voltage sensing circuit coupled to each of the at least two planar sensing coils of the angular position sensor.

The present invention additionally provides a method for sensing an angular position of a rotatable inductive coupling element which includes, establishing a magnetic coupling between at least one planar excitation coil and at least two planar sensing coils to induce a time varying voltage in the at least two planar sensing coils, wherein the at least two planar sensing coils are positioned within an interior of the at least one planar excitation coil and wherein each of the at least two planar sensing coils comprises a clockwise winding portion positioned opposite a counter-clockwise winding portion. The method further includes, positioning a rotatable inductive coupling element comprising a sector aperture in overlying relation to the at least one planar excitation coil and separated from the at least one planar excitation coil by an air gap, the rotatable inductive coupling element to cause a variation in a magnetic coupling between the at least one planar excitation coil and the winding portions of each of the at least two planar sensing coils over which the sector aperture of the rotatable inductive coupling element is not substantially aligned and measuring a time varying voltage induced in the at least two planar sensing coils as a result of the variation in the magnetic coupling between the at least one planar excitation coil and the winding portions of each of the at least two planar sensing coils over which the sector aperture of the rotatable inductive coupling element is not substantially aligned to determine an angular position of the rotatable inductive coupling element relative to the position of the at least two planar sensing coils.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DETAILED DESCRIPTION OF THE INVENTION

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Detailed Description of the Invention, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, regions, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention provides an inductive angular position sensor having a planar coil assembly that can be implemented on a single layer printed circuit board (PCB). In various embodiments, the present invention provides a pattern for a planar coil assembly layout that can be etched on a PCB to implement a resolver or inductive sensor that can be used for position sensing. The coil pattern of the present invention can be positioned on a single layer or alternatively, on two layers of a PCB, thereby resulting in an implementation that is significantly less expensive than multilayer PCB implementations currently known in the art. Multiple layer layouts, having reduced layers in relation to the prior art are similarly enabled.

Figure 1A:
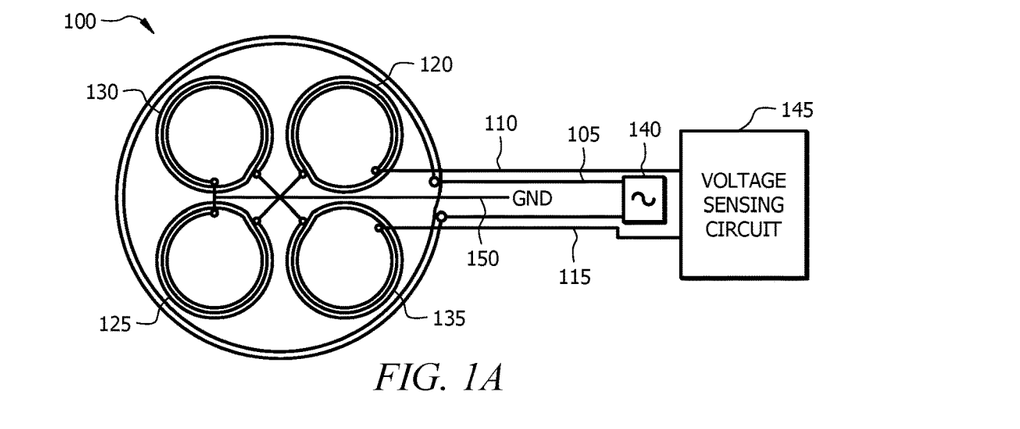
FIG. 1A is a diagram illustrating the coil assembly of an angular position sensor, in accordance with an embodiment of the present invention.

With reference to FIG. 1A, in one embodiment of the present invention, an angular position sensor includes a coil assembly 100 comprising at least one planar excitation coil 105 and at least two planar sensing coils 110, 115 positioned within an interior of the at least one planar excitation coil 105, each of the at least two planar sensing coils 110, 115 includes a clockwise winding portion 120, 135 positioned opposite a counter-clockwise winding portion 125, 130. As such, in this embodiment, a first one 110 of the at least two planar sensing coils includes a clockwise winding portion 120 and a counter-clockwise winding portion 125 positioned opposite each other within an interior of the at least one planar excitation coil 105. In addition, a second one 115 of the at least two planar sensing coils includes a clockwise winding portion 135 and a counter-clockwise winding portion 130 positioned opposite each other within an interior of the at least one planar excitation coil 105.

The planar excitation coil 105 and winding portions 120, 125, 130 135 of the two planar sensing coils 110, 115 may include one or more winding turns, as shown in FIG. 1A. The number of winding turns of the planar excitation coil 105 and the two planar sensing coils 110, 115 may be determined by the sensing voltage range required by the sensing circuit employing the coil assembly 100. However, the number of winding turns of the winding portions 120, 125, 130, 135 of the two planar sensing coils 110, 115 should preferably be equal and the pattern formed by the winding portions 120, 125, 130, 135 should preferably be symmetrically placed in the interior of the planar excitation coil 105. As such, the number of winding turns of the clockwise winding portion 120, 135 of each of the two planar sensing coils 110, 115 is preferably equal to a number of winding turns of the counter-clockwise winding portion 125, 130 of each of the two planar sensing coils 110, 115. In the embodiment illustrated in FIG. 1A, the winding portions 120, 125, 130, 135 of the two planar sensing coils 110, 115 are distributed symmetrically in each quadrant of a circle formed by the excitation coil 105.

The planar excitation coil 105 of the coil assembly 100 is coupled to a sinusoidal alternating current source 140. The sinusoidal alternating current source 140 may be any of the numerous AC current sources known in the art including, but not limited to, oscillator circuits. The two planar sensing coils 110, 115 are coupled between a ground node 150 and a voltage sensing circuit 145. In operation of the coil assembly 100, when an AC current is injected into the planar excitation coil 105 by the sinusoidal alternating current source 140 a time varying magnetic field is established in the vicinity of the planar excitation coil 105 which includes a time varying voltage in the two planar sensing coils 110, 115. Since the winding directions of the winding portions of the two planar sensing coils 110, 115 are opposite each other, a zero net voltage is induced in the two planar sensing coils 110, 115. The voltage sensing circuit 145 senses and measures the time varying voltage in the two planar sensing coils 110, 115. Each of the planar sensing coils are terminated to a common ground node 150 used for the voltage sensing circuit 145.

In various embodiments, the coil assembly 100 of the present invention may be implemented on a substrate, such as a printed circuit board (PCB). Etching of printed circuit boards is commonly known in the art to form conductive traces having desired patterns on either single layer or multilayer substrates. In one embodiment, the coil assembly 100 of the present invention may be implemented on a single layer of a printed circuit board (PCB), wherein the entire coil assembly 100 is positioned on the top layer of the substrate and only a few routing connections are implemented in another layer of the PCB. In this embodiment the routing connections may be coupled to the coil assembly 100 through conductive vias connecting the layers of the PCB substrate. In another embodiment, the planar excitation coil 105 of the coil assembly 100 may be positioned on one layer of the PCB substrate and the planar sensing coils 110, 115 may be positioned on a different layer of the PCB substrate. While, in this embodiment, the planar sensing coils 110, 115 and the excitation coil 105 are positioned on different layer of the PCB substrate, the alternating current flowing in the excitation coil 105 is sufficient to induce a time varying voltage in the two planar excitation coils 110, 115 that can be measured by the sensing circuit 145.

In the embodiment illustrated in FIG. 1A, the planar excitation coil 105 and the winding portions 120, 125, 130, 135 of the two planar sensing coils 110, 115 are both positioned on the surface of the substrate and each comprises multiple winding turns and as such, may be more commonly referred to as spiral conductive traces.

In various embodiments, an angular position sensor in accordance with the present invention is provided which includes, the coil assembly 100 of FIG. 1A in combination with a rotatable inductive coupling element 160, as illustrated with reference FIG. 1B. The rotatable inductive coupling element 160 includes a sector aperture 165, wherein a center angle 170 of the sector aperture 165 is determined by the number of planar sensing coils that are included in the coil assembly 100. In an exemplary embodiment, the rotatable inductive coupling element 160 may be a substantially circular metal disk which preferably includes a sector aperture 165 having a center angle 170 of substantially 90°. In general, the rotatable inductive coupling element 160 may be fabricated of any material that is effective in changing the time varying voltage induced in the planar sensing coils 110, 115 when it is placed in the time varying magnetic field in the vicinity of the excitation coil 105. The center angle 170 of the sector aperture 165 of the rotatable inductive coupling element 160 is determined by the number of planar sensing coils, wherein the center angle 170 of section aperture 165 is equal to 360°÷(number of planar sensing coils×2). Accordingly, when there are two planar sensing coils, the center angle of the rotatable inductive coupling element is equal to 90° and when there are three planar sensing coils, the center angle of the rotatable inductive coupling element is equal to 60°.

Figure 1B:
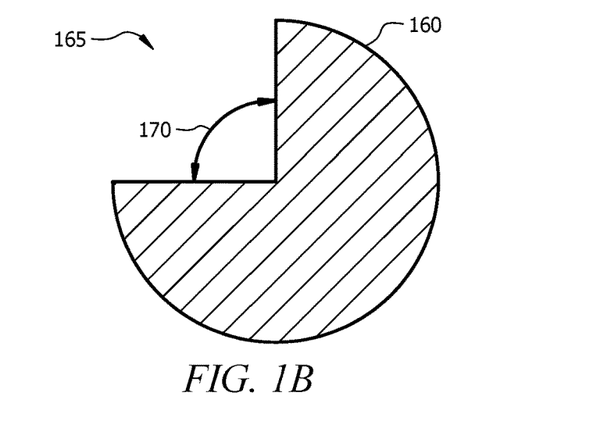
FIG. 1B is a diagram illustrating a rotatable inductive coupling element of an angular position sensor, in accordance with an embodiment of the present invention.
Figure 1C:
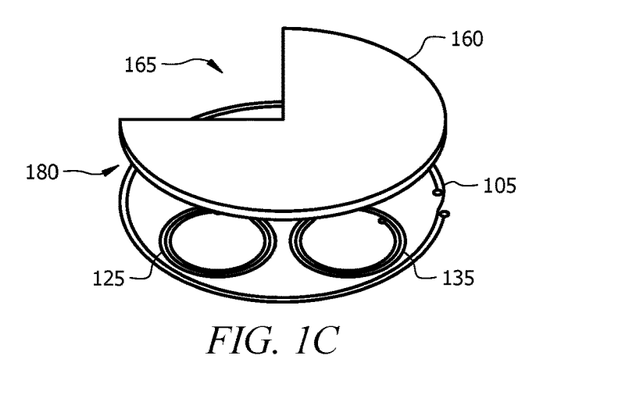
FIG. 1C is a diagram illustrating the positioning of the coil assembly and the rotatable inductive coupling element, in accordance with an embodiment of the present invention.

The rotatable inductive coupling element 160, as shown in FIG. 1C, is positioned in overlying relation to the coil assembly 100 and separated from the coil assembly 100 by an airgap 180. Due to the sector aperture 165 of the rotatable inductive coupling element 160, and depending upon the position of the rotatable inductive coupling element 160 in relation to the coil assembly 100, a first portion of the coil assembly 100 will be covered by the overlying rotatable inductive coupling element 160 and a second portion of the coil assembly 100 will be not be covered by the overlying rotatable inductive coupling element 160 because the sector aperture 165 will be positioned over said second portion of the coil assembly 100. As the rotatable inductive coupling element 160 is rotated, the sector aperture 165 will be positioned over different portions of the coil assembly 100. When the rotatable inductive coupling element 160 is positioned within the time varying magnetic field established between the planar excitation coil 115 and the at least two planar sensing coils 110, 115 of the coil assembly 100, a change in the magnetic field results in the region where the coil assembly 100 is covered by the rotatable inductive coupling element 160. Positioning the rotatable inductive coupling element 160 within the magnetic field induces eddy currents in the rotatable inductive coupling element 160 which dampens the time varying magnetic field in the region of the coil assembly covered by the rotatable inductive coupling element 160. As a result of the induction of eddy currents in the rotatable inductive coupling element 160, the time varying voltage induced in the windings portions of the planar sensing coils 110, 115 covered by the rotatable inductive coupling element 160 are attenuated and the time varying voltage induced in the winding portions of the planar sensing coils 110, 115 that are not covered by the rotatable inductive coupling element 160, i.e. those covered by sector aperture 165, are not attenuated.

In the exemplary embodiment illustrated in FIG. 1B and FIG. 1C, the rotatable inductive coupling element 160 is a circular metal disk comprising a sector aperture 165 having a center angle 170 of 90° and the radius of the circular metal disk is substantially equal to the radius of the outmost winding turn of the excitation coil 105. As such, in this embodiment, when the rotatable inductive coupling element 160 is positioned in overlying relationship to the coil assembly 100, the rotatable inductive coupling element 160 is positioned substantially concentrically above the coil assembly 100 and separated from the coil assembly 100 by an air gap 180.

Figure 2A:
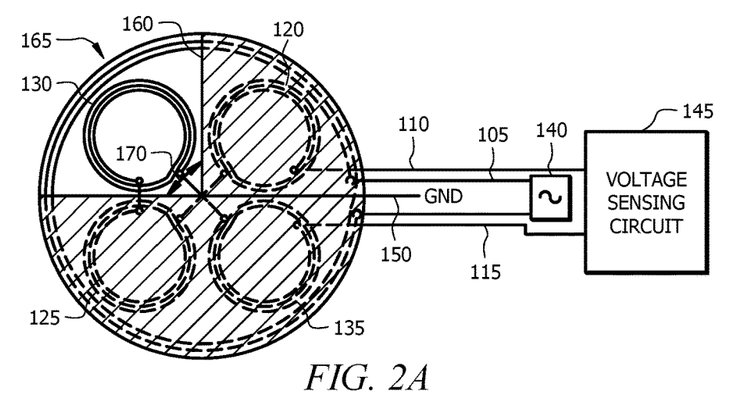
FIG. 2A is a diagram illustrating the angular position sensor at a 0° angular rotation position, in accordance with an embodiment of the present invention.
Figure 2B:
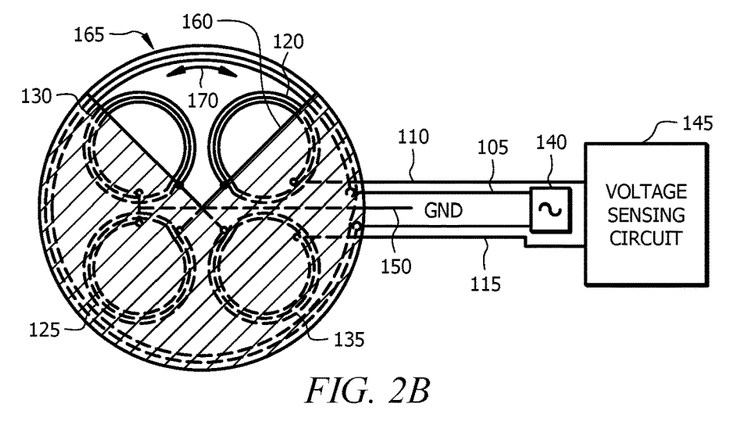
FIG. 2B is a diagram illustrating the angular position sensor in a 45° angular rotation position, in accordance with an embodiment of the present invention.
Figure 2C:
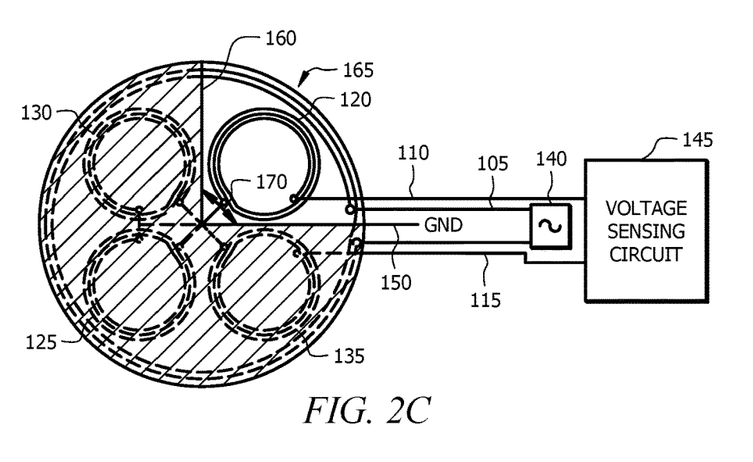
FIG. 2C is a diagram illustrating the angular position sensor in a 90° angular rotation position, in accordance with an embodiment of the present invention.
Figure 2D:
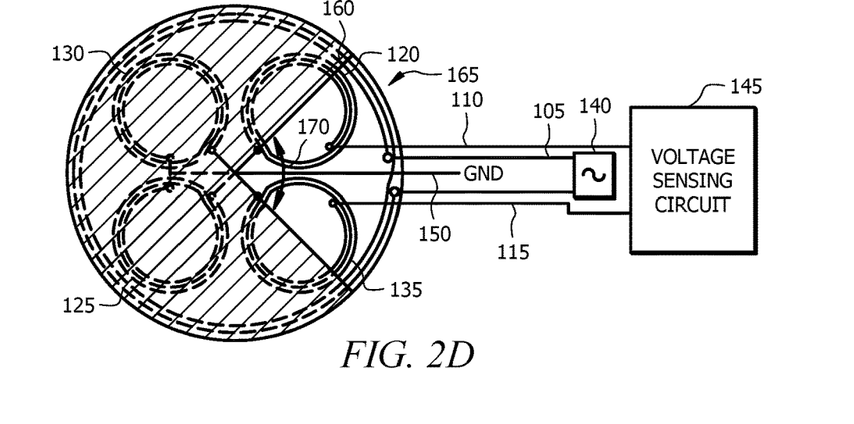
FIG. 2D is a diagram illustrating the angular position sensor in a 135° angular rotation position, in accordance with an embodiment of the present invention.
Figure 2E:
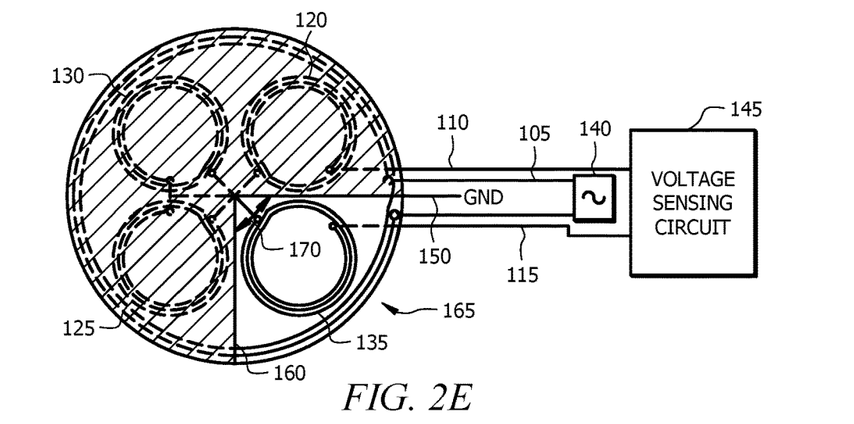
FIG. 2E is a diagram illustrating the angular position sensor in a 180° angular rotation position, in accordance with an embodiment of the present invention.
Figure 2F:
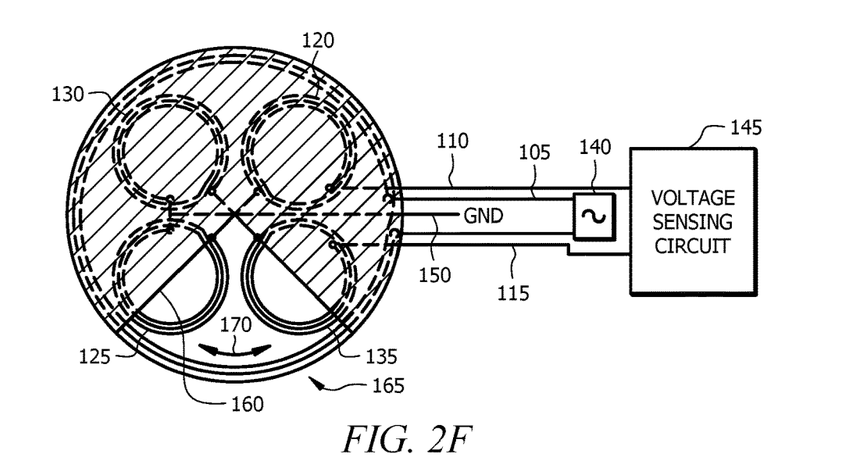
FIG. 2F is a diagram illustrating the angular position sensor in a 225° angular rotation position, in accordance with an embodiment of the present invention.
Figure 2G:
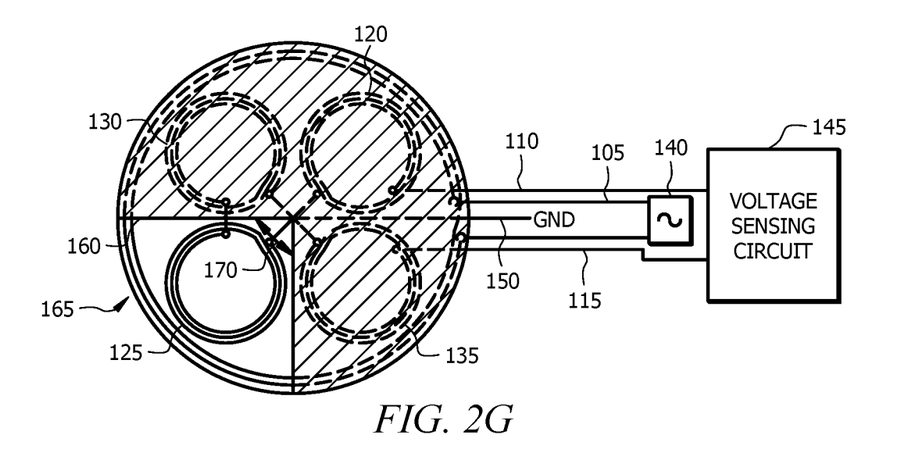
FIG. 2G is a diagram illustrating the angular position sensor in a 270° angular rotation position, in accordance with an embodiment of the present invention.
Figure 2H:
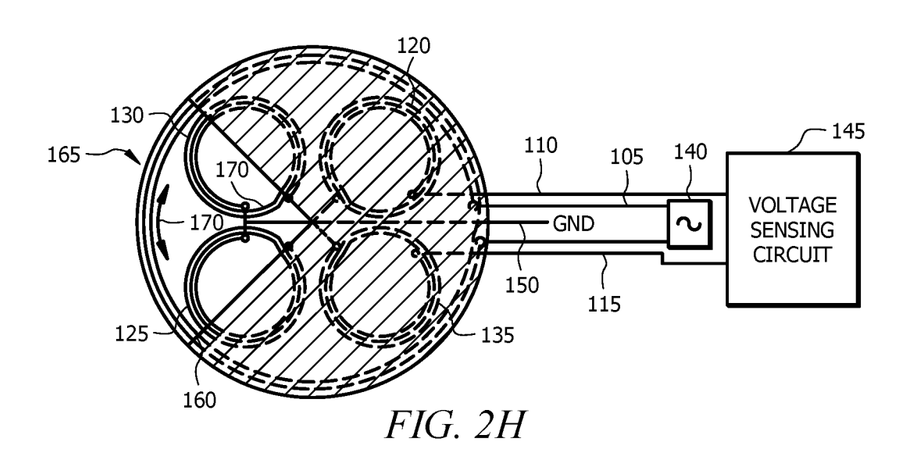
FIG. 2H is a diagram illustrating the angular position sensor in a 315° angular rotation position, in accordance with an embodiment of the present invention.

As illustrated in FIG. 2A-FIG. 2H, as the rotatable inductive coupling element 160 make a 360° rotation, the magnitude of the time varying voltage induced in the planar sensing coils 110, 115 changes based upon the position on the sector aperture 165 of the rotatable inductive coupling element 160 relative to the coil assembly 100. In the embodiment illustrated in FIG. 2A-FIG. 2H, the sector aperture 165 has a 90° center angle 170 and the coil assembly 100 comprises two planar sensing coil 110, 115, wherein a first planar sensing coil 110 comprises a clockwise winding portion 120 and a counter-clockwise winding portion 125 and a second planar sensing coil 115 comprises a clockwise winding portion 130 and a counter-clockwise winding portion 135. As such, in FIG. 2A, the sector aperture 165 is positioned over the clockwise winding portion 130 of the second planar sensing coil 115. In FIG. 2B, the sector aperture 165 is positioned over half of the clockwise winding portion 130 of the second planar sensing coil 115 and half of the clockwise winding portion 120 of the first planar sensing coil 110. In FIG. 2C, the sector aperture 165 is positioned over the clockwise winding portion 120 of the first planar sensing coil 110. In FIG. 2D, the sector aperture 165 is positioned over half of the clockwise winding portion 120 of the first planar sensing coil 110 and half of the counter-clockwise winding portion 135 of the second planar sensing coil 115. In FIG. 2E, the sector aperture 165 is positioned over the counter-clockwise winding portion 135 of the second planar sensing coil 115. In FIG. 2F, the sector aperture 165 is positioned over half of the counter-clockwise winding portion 135 of the second planar sensing coil 115 and half of the counter-clockwise winding portion 125 of the first planar sensing coil 110. In FIG. 2G, the sector aperture 165 is positioned over the counter-clockwise winding portion 125 of the second planar sensing coil 115. In FIG. 2H, the sector aperture 165 is positioned over half of the counterclockwise winding portion 125 of the second planar sensing coil 115 and half of the clockwise winding portion 130 of the first planar sensing coil 110.

As the rotatable inductive coupling element 160 is rotated through each of the positions shown in FIG. 2A-FIG. 2H, the time varying voltage induced in each of the planar sensing coils 110, 115 is measured by the voltage sensing circuit 145. The voltages measured by the voltage sensing circuit 145 are sine and cosine functions of the angle of rotation of the sector aperture 165 of the rotatable inductive coupling element 160 relative to the coil assembly 100. When the sector aperture 165 is positioned as in FIG. 2A, the time varying magnetic field is attenuated above the clockwise winding portion 120 and the counter-clockwise winding portion 125 of the first planar sensing coil 110 and above the counter-clockwise winding portion 135 of the second planar sensing coil 115, but the time varying magnetic field is not attenuated above the clockwise winding portion 130 of the second planar sensing coil 115. As such, the time varying voltage induced in the counter-clockwise winding portion 135 of the second planar sensing coil 115 is different than the time varying voltage induced in the clockwise winding portion 130 of the second planar sensing coil 115. This difference in the induced voltage is measured by the voltage sensing circuit 145.

Figure 3:
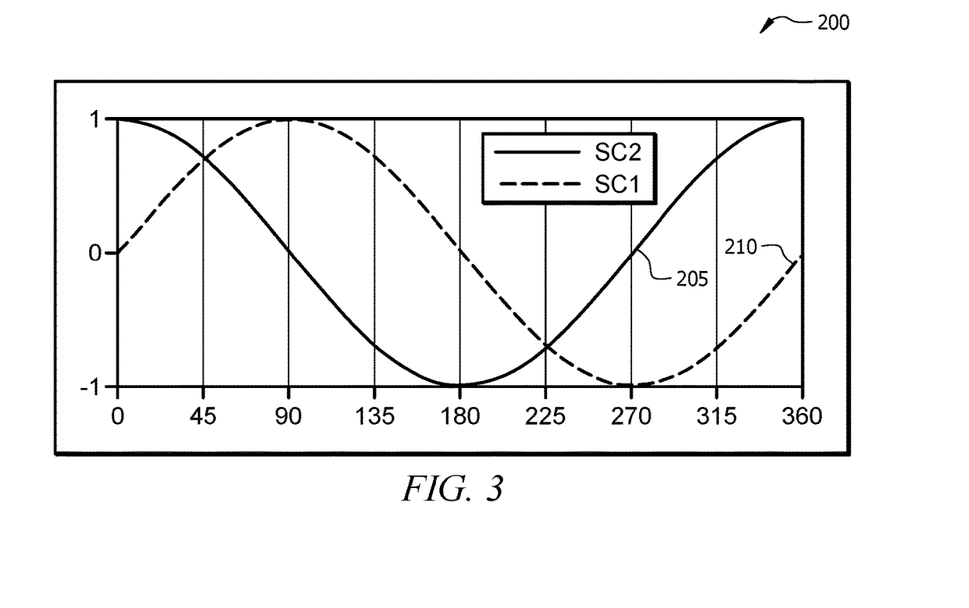
FIG. 3 is a graphical illustration of the voltage magnitude variation of the planar sensing coils with respect to position of the rotatable inductive coupling element, in accordance with an embodiment of the present invention.

As shown in FIG. 3, with the position of the sector aperture 165 as shown in FIG. 2A considered as the zero rotation reference point, the net voltage 210 induced in the clockwise winding portion 120 and counter-clockwise winding portion 125 of the first planar sensing coil 110 is zero because both of the winding portions of the first planar sensing coil 110 are covered by the rotatable inductive coupling element 160. However, the net voltage 205 induced in the second planar sensing coil 115 is at a peak value because the clockwise winding portion 130 of the second planar sensing coil 115 is not covered at all by the rotatable inductive coupling element 160 and the counter-clockwise winding portion 135 is completely covered by the rotatable inductive coupling element 160. The peak value of the sine and cosine functions of the time varying voltage of the planar sensing coils 110, 115 is dependent upon the airgap 180 between the coil assembly 110 and the rotatable inductive coupling element 160, the number of winding turns of the excitation coil 105 and the number of winding turns of the planar sensing coils 110, 115.

The graph 200 of FIG. 3 illustrates the voltage magnitude variation of the first planar sensing coil 110 and the second planar sensing coil 115 with respect to the position of the sector aperture 165 of the rotatable inductive coupling element 160. The voltage magnitude variation is sensed by the voltage sensing circuit 145 and the measurements may be further processed to provide the target angular position. For example, if the magnitude of the voltage 210 of the first planar sensing coil 110 is measured as a zero voltage and the magnitude of the voltage 205 of the second planar sensing coil 115 is measured as a negative peak voltage, in can be determined from a comparison of the measured voltages that the angular position of the rotatable inductive coupling element 160 is at 180°, which is equivalent to the configuration illustrated in FIG. 2E.

Figure 4:
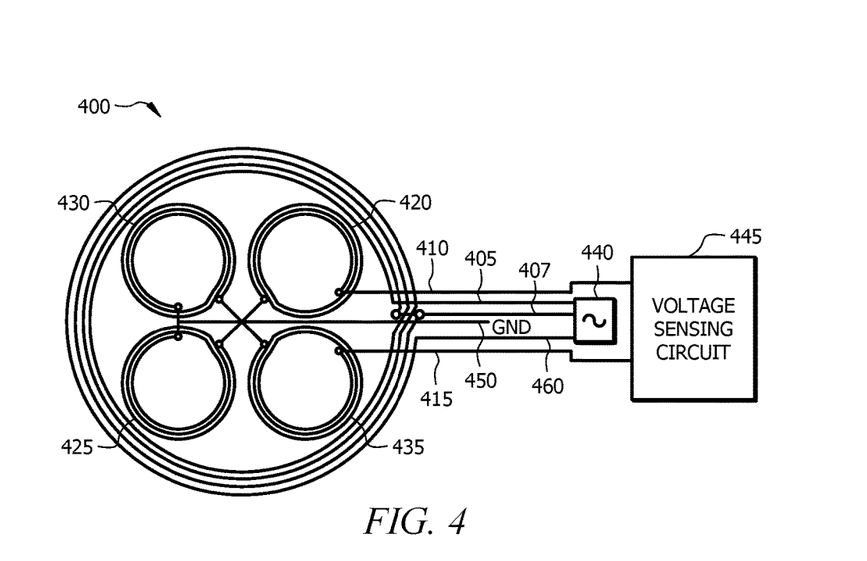
FIG. 4 is a diagram the coil assembly of an angular position sensor comprising two excitation coils, in accordance with an embodiment of the present invention.

With reference to FIG. 4, in an additional embodiment, the coil assembly 400 of the angular position sensor may include more than one excitation coil. In this exemplary embodiment, the coil assembly 400 includes a first excitation coil 405 and a second excitation coil 460 coupled to a common point 407. A sinusoidal alternating current source 440 is coupled to both of the excitation coils 405, 460 such that a time varying magnetic field is generated by both the first excitation 405 and the second excitation coil 460. In this embodiment, the sinusoidal alternating current source 440 may be a cross-coupled oscillator circuit, which are commonly known in the art for generating sinusoidal alternating current. As in the previous embodiment employing a single excitation coil, a first planar sensing coil 410 includes a clockwise winding portion 420 and a counter-clockwise winding portion 425 and a second planar sensing coil 415 includes a clockwise winding portion 430 and a counter-clockwise winding portion 435. The first planar sensing coil 410 and the second planar sensing coil 415 are coupled to a voltage sensing circuit 445 and to a ground node 450, and the voltage sensing circuit 445 is used to measure the time varying voltage induced in the planar sensing coil 410, 415 in the presence of a rotatable inductive coupling element, as previously described. This embodiment, employing two excitation coils 405, 460, is easily implemented into a common circuit topology employing a cross-coupled LC oscillator. The differential operation inherent in cross-coupled LC oscillators results in an improved phase noise performance of the circuit.

Figure 5:
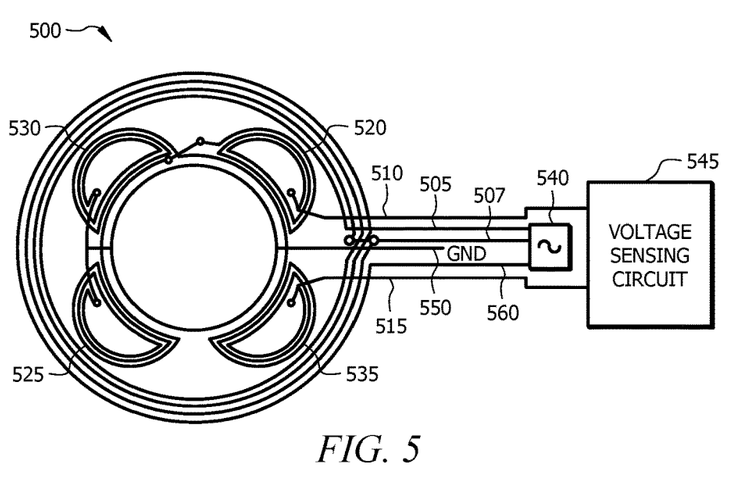
FIG. 5 is a diagram illustrating the coil assembly of an angular position sensor in accordance with an embodiment of the present invention, wherein an opening is positioned for accepting a shaft within an interior of the coil assembly.

With reference to FIG. 5, in a particular embodiment of the present invention, an opening may be positioned through the substrate on which the coil assembly 500 is fabricated and the opening may be positioned within an interior of the one or more excitation coils 505, 560 of the angular position sensor. In this embodiment, the angular position sensor includes a coil assembly 500 comprising two planar excitation coils 505, 560 coupled together at a common point 507 and at least two planar sensing coils 510, 515 positioned within an interior of the two planar excitation coils 505, 560, each of the at least two planar sensing coils 510, 515 includes a clockwise winding portion 520, 535 positioned opposite a counter-clockwise winding portion 525, 530. As such, in this embodiment, a first one 510 of the at least two planar sensing coils includes a clockwise winding portion 520 and a counter-clockwise winding portion 525 positioned opposite each other within an interior of the two planar excitation coil 505, 560. In addition, a second one 515 of the at least two planar sensing coils includes a clockwise winding portion 535 and a counter-clockwise winding portion 530 positioned opposite each other within an interior of the two planar excitation coil 505, 560.

As previously described, the two planar excitation coils 505, 560 and winding portions 529, 525, 530, 525 of the two planar sensing coils 110, 115 may include one or more winding turns, as shown in FIG. 1A. However, in this embodiment, a large opening is positioned within an interior of the two planar excitation coils 505, 560 of the coil assembly 500. As such, the winding portions 529, 525, 530, 525 of the two planar sensing coils 110, 115 are appropriately shaped to accommodate the opening. The opening may be dimensioned to accommodate a shaft positioned through the substrate on which the coil assembly 500 is fabricated.

As in the previous embodiments, the number of winding turns of the planar excitation coils 505, 560 and the two planar sensing coils 510, 515 may be determined by the sensing voltage range required by the sensing circuit employing the coil assembly 500. and the number of winding turns of the winding portions 520, 525, 530, 535 of the two planar sensing coils 510, 515 should preferably be equal and the pattern formed by the winding portions 520, 525, 530, 535 should preferably be symmetrically placed in the interior of the planar excitation coils 505, 560. As such, the number of winding turns of the clockwise winding portion 520, 535 of each of the two planar sensing coils 520, 515 is preferably equal to a number of winding turns of the counter-clockwise winding portion 525, 530 of each of the two planar sensing coils 510, 515. In the embodiment illustrated in FIG. 1A, the winding portions 520, 525, 530, 535 of the two planar sensing coils 510, 515 are distributed symmetrically in each quadrant of a circle formed by the excitation coils 505, 560 and shaped to accommodate the opening within the interior of the coil assembly 500.

The planar excitation coils 505, 560 of the coil assembly 500 in this embodiment are coupled to a sinusoidal alternating current source 540. The two planar sensing coils 510, 515 are coupled between a ground node 550 and a voltage sensing circuit 545. As previously described with reference to the coil assembly 100 of FIG. 1A, the coil assembly 500 in this embodiment, in combination with a rotatable inductive coupling element including a sector aperture having a center angle that determined by the number of planar sensing coils that are included in the coil assembly 500, provides an angular position sensor. The operation of the embodiment illustrated in FIG. 5 is equivalent to the operation of the embodiment illustrated with reference to FIG. 2A-FIG. 2H, as is previously described in detail.

Figure 6:
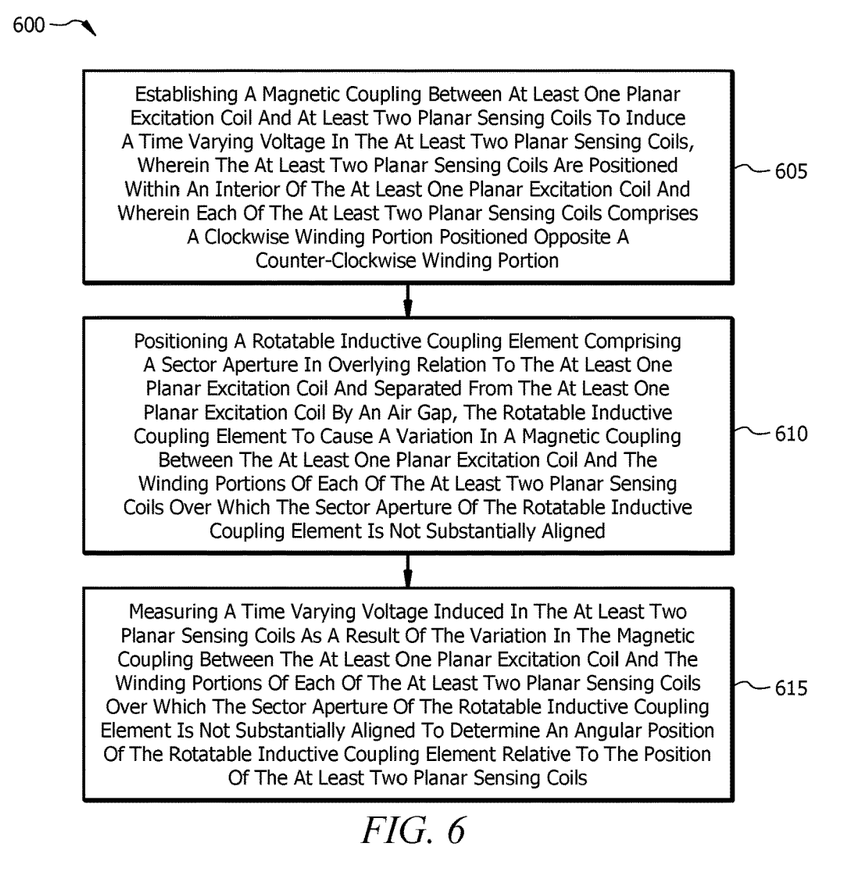
FIG. 6 is a flow diagram illustrating a method for sensing an angular position of a rotatable inductive coupling element, in accordance with an embodiment of the present invention.

FIG. 6 is a flow diagram of a method 600 for sensing an angular position of a rotatable inductive coupling element, in accordance with an embodiment of the present invention.

At operation 605, the method includes establishing a magnetic coupling between at least one planar excitation coil and at least two planar sensing coils to induce a time varying voltage in the at least two planar sensing coils, wherein the at least two planar sensing coils are positioned within an interior of the at least one planar excitation coil and wherein each of the at least two planar sensing coils comprises a clockwise winding portion positioned opposite a counter-clockwise winding portion. With reference to FIG. 1A, in the present invention a magnetic coupling is established between at least one planar excitation coil 105 and at least two planar sensing coils 110, 115 positioned in an interior of the excitation coil 105 to induce a time varying voltage in the at least two planar sensing coil 110, 115, wherein each of the at least two planar sensing coils 110, 115 comprises a clockwise winding portion 120, 130 positioned opposite a counter-clockwise winding portion 125, 135.

At operation 610, the method includes, positioning a rotatable inductive coupling element comprising a sector aperture in overlying relation to the at least one planar excitation coil and separated from the at least one excitation coil by an air gap, the rotatable inductive coupling element to cause a variation in a magnetic coupling between the at least one planar excitation coil and the winding portions of each of the at least two planar sensing coils over which the sector aperture of the rotatable inductive coupling element is not substantially aligned. With reference to FIG. 1C, in the present invention a rotatable inducting coupling element 160 comprising a sector aperture 165 is positioned in overlying relation to the at least one planar excitation coil 105 and separated from the at least one excitation coil by an air gap 180 to cause a variation in a magnetic coupling between the at least one planar excitation coil 105 and the winding portions of each of the at least two planar sensing coils 110, 115 over which the sector aperture 165 of the rotatable inductive coupling element 160 is not substantially aligned.

At operation 615, the method includes, measuring a time varying voltage induced in the at least two planar sensing coils as a result of the variation in the magnetic coupling between the at least one planar excitation coils and the winding portions of each of the at least two planar sensing coils over which the sector aperture of the rotatable inductive coupling element is not substantially aligned to determine an angular position of the rotatable inductive coupling element relative to the position of the at least two planar sensing coils. With reference to FIG. 1A, in the present invention, a voltage sensing circuit 145 is used to measure a time varying voltage induced in the at least two planar sensing coil 110, 115 as a result of the variation in the magnetic coupling between the at least one planar excitation coil 105 and the winding portions 120, 125, 130, 135 of each of the at least two planar sensing coils 110, 115 over which the sector aperture 165 of the rotatable inductive coupling element 160 is not substantially aligned to determine an angular position of the rotatable inductive coupling element 160 relative to the position of the at least two planar sensing coils 110, 115.

The system and method of the present invention provides an improved, non-contact, inductive, angular position sensor which utilizes a planar coil assembly that can be implemented on a printed circuit board (PCB) comprising a minimum number of PCB layers.

In one embodiment, portions of the angular position sensor and angular position sensing system may be implemented in an integrated circuit as a single semiconductor die. Alternatively, the integrated circuit may include multiple semiconductor die that are electrically coupled together such as, for example, a multi-chip module that is packaged in a single integrated circuit package.

In various embodiments, portions of the system of the present invention may be implemented in a Field Programmable Gate Array (FPGA) or Application Specific Integrated Circuit (ASIC). As would be appreciated by one skilled in the art, various functions of circuit elements may also be implemented as processing steps in a software program. Such software may be employed in, for example, a digital signal processor, microcontroller or general-purpose computer.

In one specific embodiment coil assembly 100 is formed by etching or printing conductive traces on a top layer of a circuit board such that all of the planar excitation coils 105 and the winding portions 120, 125, 130, 135 are formed on a single layer of the circuit board. Voltage sensing circuit 145 and/or sinusoidal alternating current source 140 may be implemented in one or more semiconductor die that is soldered to the circuit board upon which coil assembly 100 is formed to electrically couple the coil assembly to the one or more integrated circuit die. Vias and interconnects between the one or more semiconductor die, and planar excitation coils 105 and planar sensing coils 110, 115 may extend within other conductive layers of the circuit board. In this embodiment rotatable inductive coupling element 160 is connected to the circuit board so that it may rotate in a plane parallel to the top layer of the circuit board. Moreover, the angular positioning sensing system may include a housing or other enclosure that encloses the rotatable inductive coupling element 160, the semiconductor die, and some or all of the circuit board. The angular positioning sensing system may also include an interconnect structure such as, for example, a post extending from the center of inductive coupling element 160 for connection of external devices to rotatable inductive coupling element 160 for sensing the position of the external devices.

In the present embodiment an air gap extends between coil assembly 100 and rotatable inductive coupling element 160. It is appreciated that, alternatively, one or more layer of dielectric material may extend between coil assembly 100 and rotatable inductive coupling element 160.

Unless specifically stated otherwise as apparent from the discussion, it is appreciated that throughout the description, discussions utilizing terms such as "measuring", "determining", "generating", "applying", "sending", "encoding", "locking", or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Further, for purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

What we claim is:

1. An angular position sensor comprising:
   at least one planar excitation coil;
   a first planar sensing coil and a second planar sensing coil, the first and second planar sensing coils positioned within an interior of the at least one planar excitation coil, each of the planar sensing coils comprising a clockwise winding portion positioned opposite a counter-clockwise winding portion across a central axis of a circle formed by the at least one planar excitation coil; and
   a rotatable inductive coupling element comprising a rotatable conductive disk having a sector aperture, the rotatable inductive coupling element positioned in overlying relation to the at least one planar excitation coil and separated from the surface of the substrate by an air gap.

2. The angular position sensor of claim 1, further comprising a substrate comprising two or more layers and wherein the at least one planar excitation coil and the planar sensing coils are positioned on a same layer of the substrate.

3. The angular position sensor of claim 1, further comprising a substrate comprising one or more layers and wherein the at least one planar excitation coil is positioned on a different layer than the planar sensing coils.

4. The angular position sensor of claim 1, further comprising a sinusoidal alternating current source coupled to the at least one planar excitation coil.

5. The angular position sensor of claim 1, wherein the at least one planar excitation coil comprises two excitation coils and wherein the angular position sensor further comprises a cross-coupled oscillator circuit coupled to the two excitation coils.

6. The angular position sensor of claim 1, wherein the at least one planar excitation coil comprises at least one winding turn.

7. The angular position sensor of claim 1, wherein the at least one planar excitation coil is a spiral planar conductive trace positioned on a substrate.

8. The angular sensor of claim 1, wherein each of the clockwise winding portion and the counter-clockwise winding portion of each of the planar sensing coils comprises at least one winding turn and wherein a number of winding turns of the clockwise winding portion is equal to a number of winding turns of the counter-clockwise winding portion.

9. The angular position sensor of claim 1, wherein the clockwise winding portion and the counter-clockwise winding portion of each of the planar sensing coils are spiral planar conductive traces positioned on a substrate.

10. The angular sensor of claim 1, further comprising a voltage sensing circuit coupled to each of the planar sensing coils.

11. The angular sensor of claim 1, wherein the rotatable conductive disk has a radius that is substantially equal to a radius of the at least one planar excitation coil.

12. The angular position sensor of claim 1, wherein the rotatable conductive disk has a radius that is substantially equal to a radius of the at least one planar excitation coil and the sector aperture of the rotatable conductive disk has a central angle of substantially 90°.

13. An angular position sensing system comprising:
   an angular position sensor comprising;
      at least one planar excitation coil;
      a first planar sensing coil and a second planar sensing coil, the first and second planar sensing coils positioned within an interior of the at least one planar excitation coil, each of the planar sensing coils comprising a clockwise winding portion positioned opposite a counter-clockwise winding portion across a central axis of a circle formed by the at least one planar excitation coil;
      a rotatable inductive coupling element comprising a rotatable conductive disk having a radius that is substantially equal to a radius of the at least one planar excitation coil and having a sector aperture, the rotatable inductive coupling element positioned in overlying relation to the at least one planar excitation coil and separated from the at least one planar excitation coil;
   a sinusoidal alternating current source coupled to the at least one planar excitation coil of the angular position sensor; and
   a voltage sensing circuit coupled to each of the planar sensing coils of the angular position sensor.

14. The angular position sensing system of claim 13, wherein the angular position sensor further comprises a substrate comprising two or more layers and wherein the at least one planar excitation coil and the planar sensing coils are positioned on a same layer of the substrate.

15. The angular position sensor of claim 13, wherein the sector aperture of the rotatable conductive disk has a central angle of substantially 90°.

16. The angular position sensor of claim 13, wherein the rotatable conductive disk has a radius that is substantially equal to a radius of the at least one planar excitation coil and the sector aperture of the rotatable conductive disk has a central angle of substantially 90°.

17. A method for sensing an angular position of a rotatable inductive coupling element, the method comprising:
   establishing a magnetic coupling between at least one planar excitation coil and a first planar sensing coil and a second planar sensing coil to induce a time varying voltage in the planar sensing coils, wherein the planar sensing coils are positioned within an interior of the at least one planar excitation coil and wherein each of the planar sensing coils comprises a clockwise winding portion positioned opposite a counter-clockwise winding portion across a central axis of a circle formed by the at least one planar excitation coil;
   positioning a rotatable conductive disk having a radius that is substantially equal to a radius of the at least one planar excitation coil and having a sector aperture with a central angle of substantially 90° in overlying relation to the at least one planar excitation coil and separated from the at least one planar excitation coil by an air gap, the rotatable conductive disk to cause a variation in a magnetic coupling between the at least one planar excitation coil and the winding portions of each of the planar sensing coils over which the sector aperture of the rotatable conductive disk is not substantially aligned; and
   measuring a time varying voltage induced in the at planar sensing coils as a result of the variation in the magnetic coupling to determine an angular position of the rotatable conductive disk relative to the position of the planar sensing coils.

18. The method of claim 17, wherein establishing a magnetic coupling between at least one planar excitation coil and the planar sensing coils further comprises, injecting a sinusoidal alternating current into the at least one planar excitation coil using an oscillator circuit coupled to the at least one planar excitation coil.

19. The method of claim 17, further comprising rotating the rotatable conductive disk to substantially align the sector aperture over one or more of the winding portions of the planar sensing coils.

20. The method of claim 17, wherein measuring a time varying voltage induced in the planar sensing coils as a result of the variation in the magnetic coupling to determine an angular position of the rotatable conductive disk relative to the position of the planar sensing coils further comprises:
   measuring the time varying voltage of each of the planar sensing coils; and
   comparing a magnitude of the measured time varying voltage of each of the planar sensing coils to determine the angular position of the rotatable conductive disk relative to the position of the planar sensing coils.

* * * * *